(12) United States Patent
Wang et al.

(10) Patent No.: US 11,936,192 B2
(45) Date of Patent: Mar. 19, 2024

(54) METHOD OF ENERGY STORAGE IN VIBRATIONAL ENERGY HARVESTING

(71) Applicant: Flex Ltd., Singapore (SG)

(72) Inventors: Yu Wang, Shanghai (CN); Minghui Dai, Shanghai (CN); Jiangsong Zhang, Shanghai (CN); Xiao Sun, Shanghai (CN)

(73) Assignee: Flex Ltd., Singapore (SG)

( * ) Notice: Subject to any disclaimer, the term of this patent is extended or adjusted under 35 U.S.C. 154(b) by 218 days.

(21) Appl. No.: 17/212,505

(22) Filed: Mar. 25, 2021

(65) Prior Publication Data

US 2021/0305841 A1    Sep. 30, 2021

(30) Foreign Application Priority Data

Mar. 27, 2020    (CN) .......................... 202010233659.7

(51) Int. Cl.
*H02N 2/18*    (2006.01)
*H02J 7/34*    (2006.01)
*H02J 50/00*    (2016.01)

(52) U.S. Cl.
CPC ............ *H02J 50/001* (2020.01); *H02J 7/345* (2013.01); *H02N 2/181* (2013.01)

(58) Field of Classification Search
CPC ........ H02N 2/18; H02N 2/181; H01L 41/113; H01L 41/1132; H01L 41/1134; H01L 41/1136; H01L 41/1138; H10N 30/30; H10N 30/302; H10N 30/304; H10N 30/306; H10N 30/308
USPC ......................................................... 310/339
See application file for complete search history.

(56) References Cited

U.S. PATENT DOCUMENTS

2005/0285728 A1 *  12/2005  Tyndall .................. H02N 2/181
                                                      340/447
2018/0048247 A1 *  2/2018  Gerstenberger ....... H10N 30/30

OTHER PUBLICATIONS

Barbehenn, "True Grid Independence: Robust Energy Harvesting System for Wireless Sensors Uses Piezoelectric Energy Harvesting Power Supply and Li-Poly Batteries with Shunt Charger," Journal of Analog Innovation, Oct. 2010, pp. 36-38.

* cited by examiner

*Primary Examiner* — Derek J Rosenau
(74) *Attorney, Agent, or Firm* — Sheridan Ross P.C.

(57) ABSTRACT

A method of operating a vibrational energy harvesting system includes providing an energy harvester and an energy storage module. The energy storage module is coupled to the energy harvester to transfer energy to the energy storage module. The method also includes determining whether the energy transferred exceeds a predetermined threshold. The method further includes limiting the energy transferred to the energy storage module by a passive device when the energy transferred exceeds the predetermined threshold.

20 Claims, 6 Drawing Sheets

METHOD OF ENERGY STORAGE IN VIBRATIONAL ENERGY HARVESTING

CROSS REFERENCE TO RELATED APPLICATION

The present application claims the benefit of and priority to Chinese Patent Application No. 202010233659.7 filed Mar. 27, 2020, the entire disclosure of which is hereby incorporated by reference for all that it teaches and for all purposes.

FIELD

The present disclosure is related generally to energy harvesting systems, and more specifically to methods, systems, and devices for improved energy harvesting that alleviate low efficiency and complex structures.

BACKGROUND

The vibrational energy from an energy source such as a vibrator could be converted to electrical energy and harvested to power devices in the clothing industry (e.g., tags for smart clothing), the automotive industry (e.g., automobile wireless sensors), the construction industry (e.g., intelligent buildings) and so on. Vibrational energy harvesting systems generally include two parts—a transducer and a circuit including a direct current (DC)-DC converter and an energy storage device. The transducer may include or be formed from a macro fiber composite (MFC), piezoelectric transducer (PZT) or polyvinylidene fluoride (PVDF) for example. The circuit ensures that the energy generated by the transducer is available and stored for externally connected devices such as integrated circuit (IC)s for examples. Traditionally the DC-DC converter includes a high efficiency buck converter and the energy storage device includes a low capacity re-chargeable battery. Because the re-chargeable battery has a limited life cycle, the life cycle of the overall traditional vibrational energy harvesting system is also limited. Hence, there is a need for improved methods, systems and devices for vibrational energy harvesting which has an increased life cycle, improved efficient and reduced size.

DETAILED DESCRIPTION

Embodiments of the present disclosure will be described in connection with energy harvesting and energy storage using a passive storage device in combination with a passive clamping device for storing energy, methods of use, and variations thereof.

The following detailed description refers to the accompanying drawings. The same reference numbers in different drawings may identify the same or similar elements.

Figure 1A:
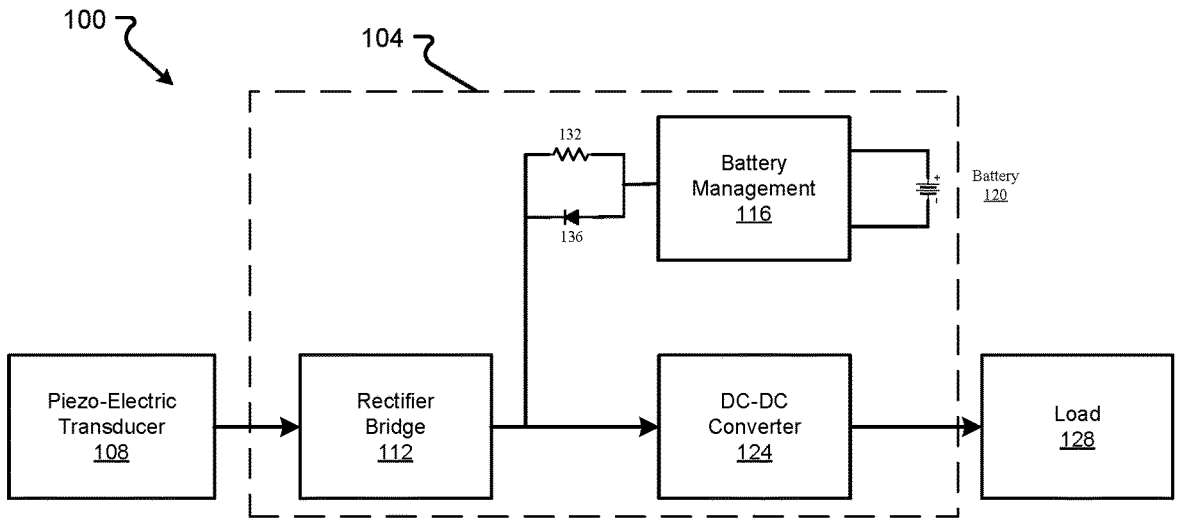
FIG. 1a is an example block diagram of a conventional vibrational energy harvesting system.

FIG. 1a is a block diagram of a conventional vibrational energy harvesting system 100. The conventional vibrational energy harvesting system 100 generally includes a circuit 104 coupled between an energy generator such as for example a piezoelectric transducer 108 and a load 128. Load 128 can include any electronic device such as but not limited to, small electronic devices, sensing devices, integrated circuits, etc. The circuit 104 includes a rectifier bridge 112, a DC-DC converter 124 such a buck converter for converting a high DC voltage to a low DC voltage, a battery management circuit 116, a battery 120, a resistor 132 and a diode 136. The piezoelectric transducer 108 is coupled to the rectifier bridge 112 such as for example, a full-wave diode bridge rectifier for conversion of alternating current (AC) voltage from the piezoelectric transducer 108 into a DC voltage. The rectifier bridge 112 is coupled to both the DC-DC converter 124 and the parallel combination of the resistor 132 and diode 136 of the battery management circuit 116. The battery management circuit 116 manages and is coupled to the battery 120 while the DC-DC converter 124 is coupled to the load 128.

Figure 1B:
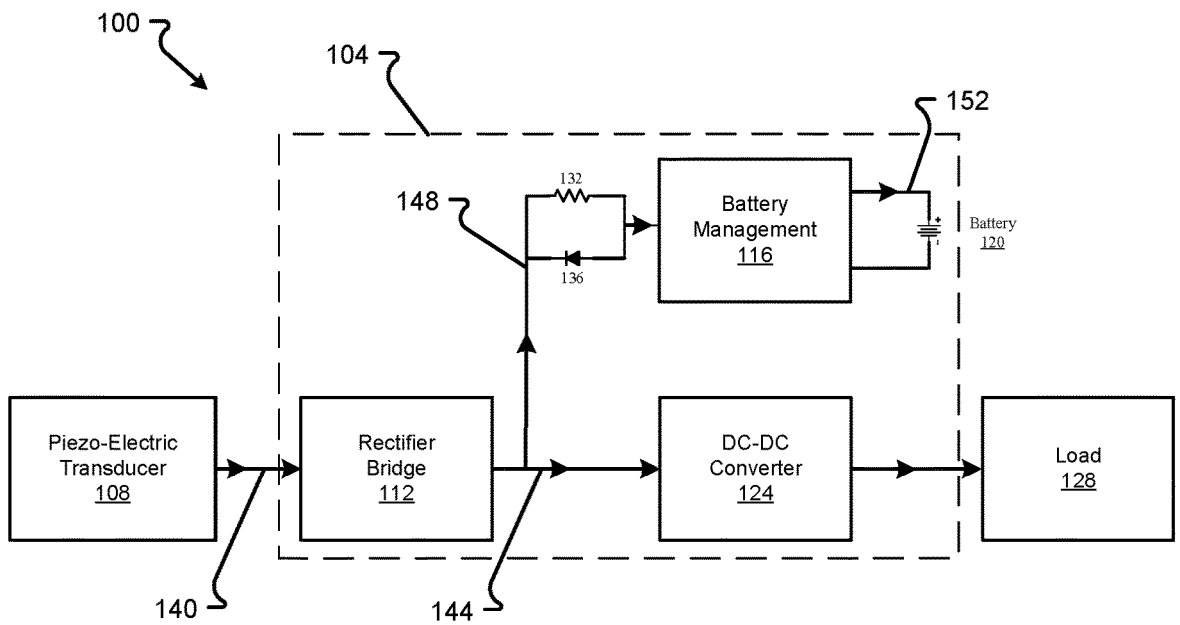
FIG. 1b is an example block diagram of a conventional vibrational energy harvesting system supplying generated energy to a load and a rechargeable battery.

As illustrated in FIG. 1b, when the piezoelectric transducer 108 operates, the conventional vibrational energy harvesting system 100 transfers energy from the piezoelectric transducer 108 at 140 to the load 128 via the rectifier bridge 112 at 144 and the DC-DC converter 124. At the same time, energy in the form of a DC voltage at 148 is supplied to the battery management circuit 116 via the resistor 132 to recharge the battery 116 at 152. When charging the battery 120 current flows through the resistor 132 to the battery 120 via the battery management 116. The resistor 132 limits the charging current to protect the battery 120. As illustrated, diode 136 is reversed biased therefore current is prevented from flowing in this direction.

Figure 1C:
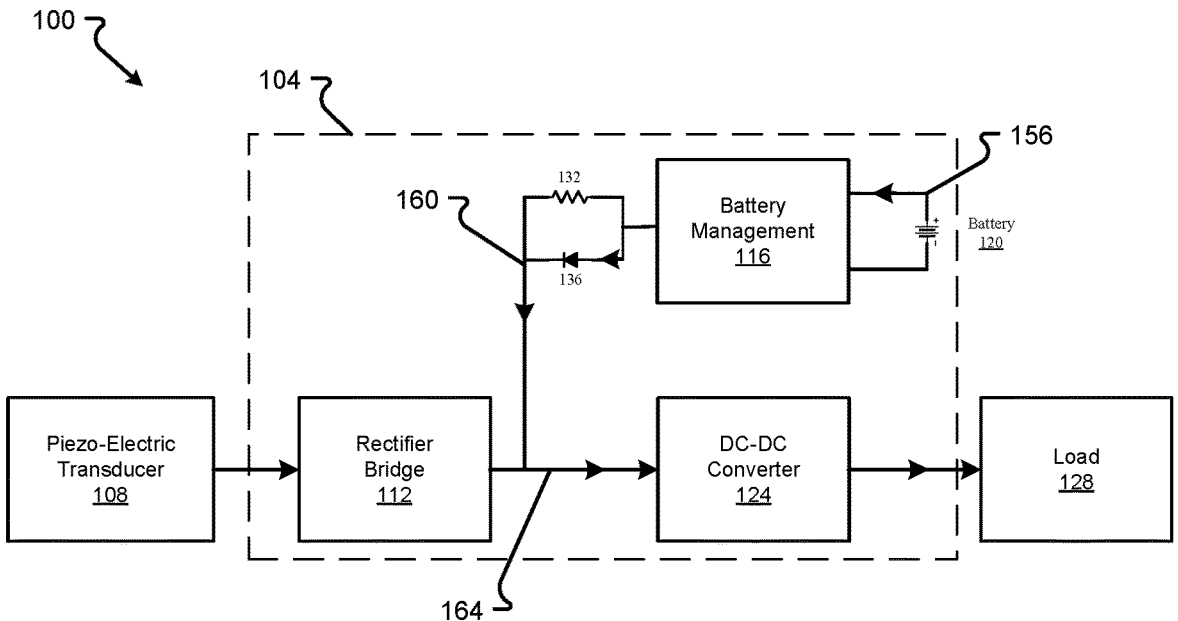
FIG. 1c is an example block diagram of a conventional vibrational energy harvesting system supply energy from the rechargeable battery to the load.

As illustrated in FIG. 1c, when the piezoelectric transducer 108 is turned off and stops vibrating, no energy is supplied by the piezoelectric transducer 108 and the energy from the battery 120 (current flow) at 156 is provided across the resistor 132 and diode 136 combination (the diode 136 operates in forward bias allowing current to flow) at 160 and is used to sustain the energy to the DC-DC converter 124 at 164 which is used to power the load 128.

The conventional vibrational energy harvesting system suffers from numerous drawbacks such as requiring too many circuit components such as the complex battery management circuit which increases the overall size and cost of the system. Given that the energy harvested is usually low (e.g., a micro-watt system) the size of the system should be kept as small as possible to be practical and applicable in various applications. Also, the system efficiency is limited due to the battery management function since a battery cannot be charged with overrated current or discharge under a low voltage, so a detection and protection circuit is required. In a micro-watt system, power losses of the battery management circuit and charge circuit becomes relatively large and leads to low efficiency of the entire system.

Moreover, the battery has a limited life cycle which limits the life of the overall system. For example, a NiMH rechargeable battery has a low Coulombic efficiency, has a life span of 300-500 cycles, has a 70% self-discharge (voltage drop in 30 days) and an energy density of 60-Wh/kg. As another example, a lithium rechargeable battery has a medium Coulombic efficiency, has a life span of 500-1000 cycles, has a 95% self-discharge and has an energy density of 120-140 Wh/kg.

Furthermore, when the piezoelectric transducer provides excessive voltage, the input voltage to the DC-DC converter will continuously increase to a level that may damage other circuit components. Thus, a protection circuit is required.

Figure 2:
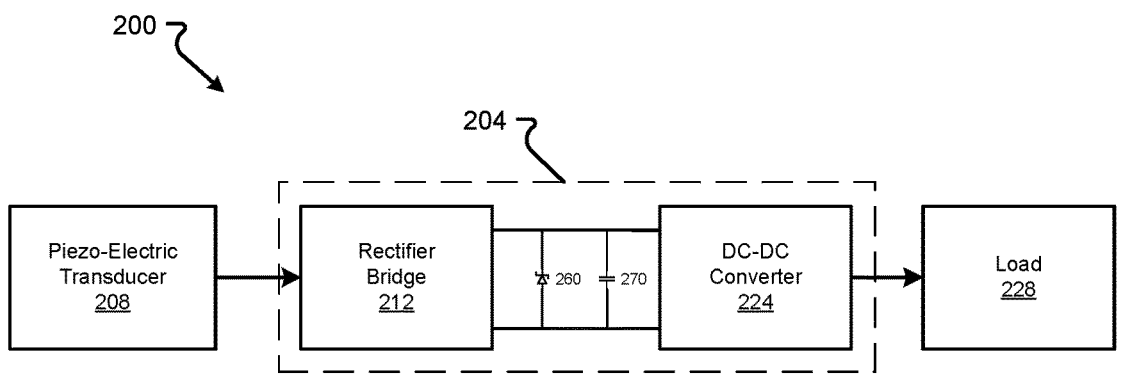
FIG. 2 is an example block diagram of a vibrational energy harvesting system in accordance with embodiments of the present disclosure.

FIG. 2 is a block diagram of a vibrational energy harvesting system 200 in accordance with embodiments of the present disclosure. The vibrational energy harvesting system 200 generally includes a circuit 204 coupled between an energy generator such as for example the piezoelectric transducer 208 and the load 228. Although load 228 is illustrated being couple to the circuit 204 via a wired connection, load 228 may also be wirelessly connected to circuit 204. The circuit 204 includes a rectifier bridge 212, a DC-DC converter 224, a transient voltage suppression (TVS) diode 260 and a super capacitor 270. The piezoelectric transducer 208 is coupled to the rectifier bridge 224 for conversion of AC voltage from the piezoelectric transducer 208 into a DC voltage. The rectifier bridge 212 is coupled to the parallel combination of the TVS diode 260 and the super capacitor 270. When the piezoelectric transducer 208 operates, the generated AC voltage is converted into DC voltage by rectifier bridge 212 and this DC voltage is used to charge the super capacitor 270 as well as to be supplied to the DC-DC converter 224. The lower voltage from the DC-DC converter 224 is used to supply power to the load 228. When the piezoelectric transducer 208 stops operating, no AC voltage is supplied to the rectifier bridge 212. As a result, the super capacitor 270 discharges and the energy (voltage) from the super capacitor 270 is supplied to the DC-DC converter 224. The lower voltage from the DC-DC converter 224 is used to supply power to the load 228.

According to embodiments of the present disclosure, the TVS diode acts as a clamping mechanism shunting excess current when an induced voltage exceeds the avalanche breakdown potential. Thus, the TVS diode 260 suppresses all over voltages above its breakdown voltage supplied from the rectifier bridge 212 to protect the super capacitor 270. According to one embodiment of the present disclosure, the TVS diode 260 illustrated in FIG. 2 is represented as a unidirectional device which operates as a rectifier in the forward direction like any other avalanche diode, but is designed and tested to handle very large peak currents as discussed in greater detail below.

The TVS diode 260 automatically resets when the over voltages from the rectifier bridge 212 is removed, but the TVS diode 260 absorbs much more of the transient energy than other devices. For example, adding a low reverse leakage current of the TVS diode 260 between the rectifier bridge 212 and the super capacitor 270 improves the robustness of the vibrational energy harvesting system 200. Moreover, since the TVS diode 260 is a passive device, its power loss is only caused by the reverse leakage current in the normal operating condition. This results in reduced power loss. The TVS diode 260 can responds to over voltages faster than other common over voltage protection components such as varistors or gas discharge tube and for the TVS diode 260, the actual clamping occurs in approximately one picosecond which makes the TVS diode 260 useful for protection against very fast and often damaging voltage transients.

Although FIG. 2 illustrates TVS diode 260 in parallel with super capacitor 270, various combinations of TVS diodes and super capacitors may be contemplated within the scope of embodiments of the present disclosure. For example, embodiments of the present disclosure include various capacitances of super capacitors, a capacitor module having a single capacitor part, super capacitors provided in series, super capacitors provided in parallel and series/parallel combinations of super capacitors. Moreover, various combinations of the TVS diode and the super capacitor may be contemplated within the scope of embodiments of the present disclosure including but not limited to a TVS diode in parallel with a super capacitor (as illustrated in FIG. 2), a TVS diode in parallel with a capacitor module including 2 or more capacitors in series and a TVS diode in parallel with a super capacitor as a module and 2 or more capacitors in series as another module.

The rated voltage range for the TVS diode is less than or equal to the rate voltage of one of the super capacitors. For example, if the rated voltage of a super capacitor is 5V, then the TVS diode rated voltage range is between 0V and 5V. As a second example, if the rated voltage of a super capacitor is 11V, then the TVS diode rated voltage range is between 5V and 11V.

As compared with the rechargeable battery, the super capacitor has a higher Coulombic efficiency than the NiMH rechargeable battery and the Lithium rechargeable battery. The super capacitor also has a life span of greater than 500,000 cycles, a self-discharge of 65% and an energy density of 1-10 Wh/kg. In addition, by incorporating the super capacitor into the vibrational energy harvesting system instead of a rechargeable battery alleviates the need for the costly battery management circuit which has the following advantages. Since the super capacitor can sustain a relatively high charge current or discharge current, there is no need to add the battery management circuit or current limiting circuit which can reduce the number of circuit components compared using the battery. This reduction in circuit components makes the overall system smaller and size reduces the power loss. As stated above, the super capacitor has a longer life cycle compared with the rechargeable battery. This longer life cycle of the super capacitor makes the overall system more reliable and which translates to less maintenance required for the system. The super capacitor also supports instantaneous large power consumption which makes the entire system robust. Therefore, the system will not shut down when an instantaneous power peak occurs.

Although incorporating the super capacitor into the vibrational energy harvesting system has numerous advantages, some of which have been identified above, one problem associated with the use of the super capacitor is the self-discharge. In some cases, the self-discharge of that super capacitor is more serious than with the rechargeable battery. This leads to increased energy waste. The self-discharge of the super capacitor is proportional to the capacity and the voltage of the super capacitor. According to embodiment of the present disclosure, by choosing a suitable capacity and an operational voltage of the super capacitor, the self-discharge energy can be reduced to just several micro-watts. Considering that a vibrational energy harvesting system incorporating a rechargeable battery, a battery management circuit and a charge/discharge path will cost many microwatts, a design incorporating super capacitor will be more efficient.

Another problem associated with the use of the super capacitor in a vibrational energy harvesting system is the smaller energy density of the super capacitor as compared with the rechargeable battery. Therefore, a vibrational energy harvesting system incorporating a super capacitor cannot sustain long periods of time without vibrational energy being generated by the system. Thus, according to embodiments of the present disclosure, vibrational energy harvesting systems incorporating a super capacitor are particularly suitable to applications where vibrational energy is not absent for long periods time.

Figure 3:
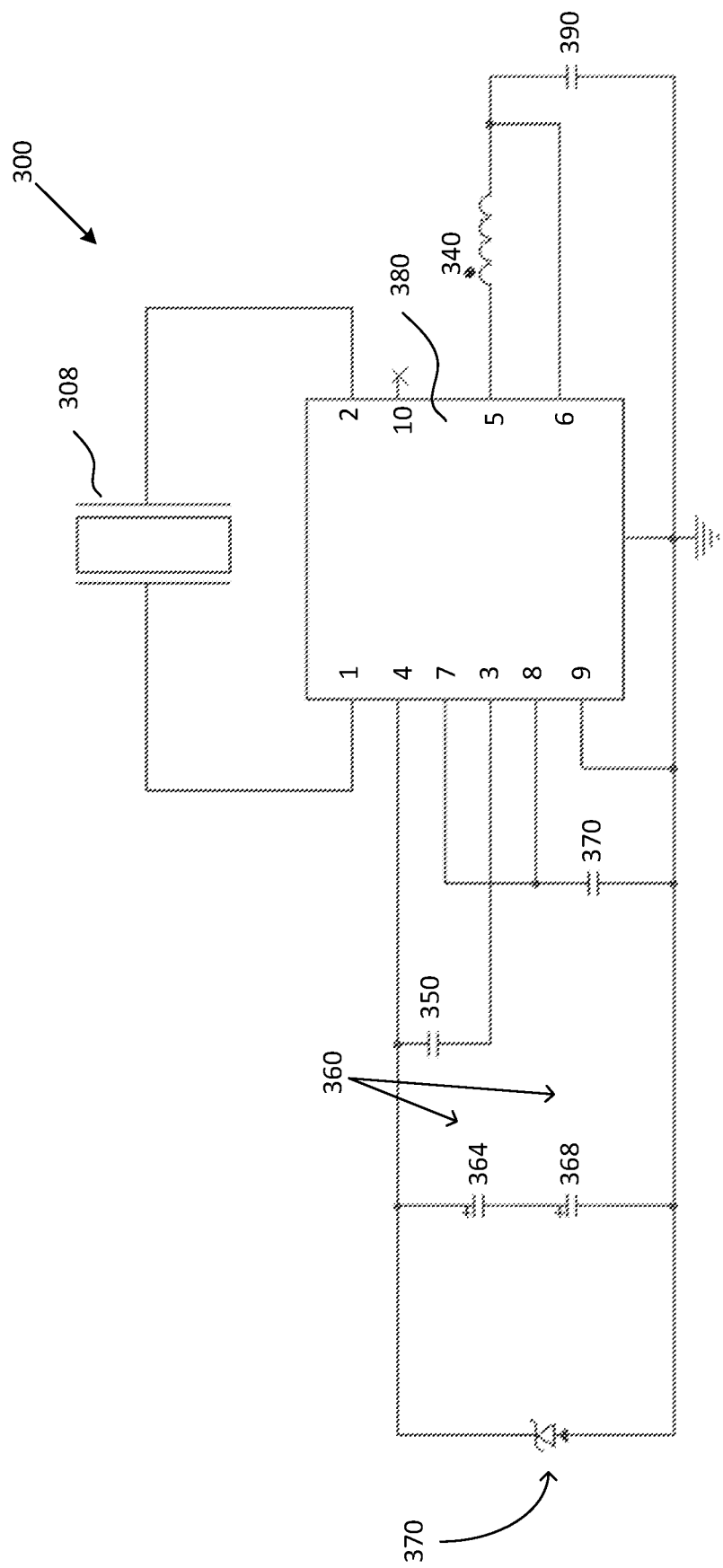
FIG. 3 is an example detailed schematic diagram of the vibrational energy harvesting system in according with embodiments of the present disclosure.

FIG. 3 is a detailed schematic diagram of an example vibrational energy harvesting system (without a load attached) 300 according with embodiments of the present disclosure. Vibrational energy harvesting system 300 may include TVS diode 370, a capacitor module 360 including capacitors 364 and 368, a piezoelectric transducer 308, an integrated circuit 380 including a rectifier bridge and a DC-DC converter, capacitors 350, 370 and 390 and inductor 340. Integrated circuit 380 includes pins 1 through 10. Pins 1 and 2 of the integrated circuit 380 are each connected to a wire or trace that leads to the input and the output of the piezoelectric transducer 308. The piezoelectric transducer 308 operates for example, at a self-resonant frequency of 22.5 Hz. Pin 4 of the integrated circuit 380 receives power from an input power source. In this case pin 4 receives the voltage of the TVS diode 370 in parallel with the capacitor module 360. The TVS diode 370 has a reverse protecting point of 10V and a breakdown voltage in the range of 11.1V to 12.3V for example. The capacitor module 360 represented by the series connection of capacitors 364 and 368, each may have for example a voltage of 5.5V and a capacitance of 0.22 F. The input voltage VIN is rectified by the internal rectifier bridge before being suppled to the internal DC-DC converter. Pin 5 of the integrate circuit 380 represents a switch which opens and closes to prevent or allow, respectively, a voltage drop across the inductor 340. Pin 3 of the integrated circuit 380 represents an internal rail referenced to VIN to serve as a gate drive for switch 5. Capacitor 350 is provided between pins 3 and 4 and may have for example, a capacitance of 1 µF.

Pin 6 of the integrated circuit 380 represents the output voltage of the integrated circuit 380. The output of the integrated circuit 380 represents a step-down voltage from the input voltage. Inductor 340 is provided between pins 5 and 6. Pin 7 of the integrated circuit represents a gate drive for the switch 5 and pin 8 of the integrate circuit represents an output voltage select bit. Capacitor 379 is provided between pin 7 and ground. Pin 9 of the integrated circuit 380 is connected to ground. Pin 10 of the integrated circuit 380 represents an indicator of a good or bad voltage for the system. As stated above, in the vibrational energy harvesting system 300 no load is included. A load would be attached across the output of circuit in parallel to capacitor 390.

According to the operation of the vibrational energy harvesting system 300 which performs well at a low power level, the power loss from self-discharge by the super capacitor 360 is about 2-3 microwatts. The power consumption is only about 10-20 microwatts varying with the voltage of the super capacitor 360 without a load attached to the system. The efficiency of the system can reach 74% when a 220 micro watt load is coupled to the system.

Figure 4:
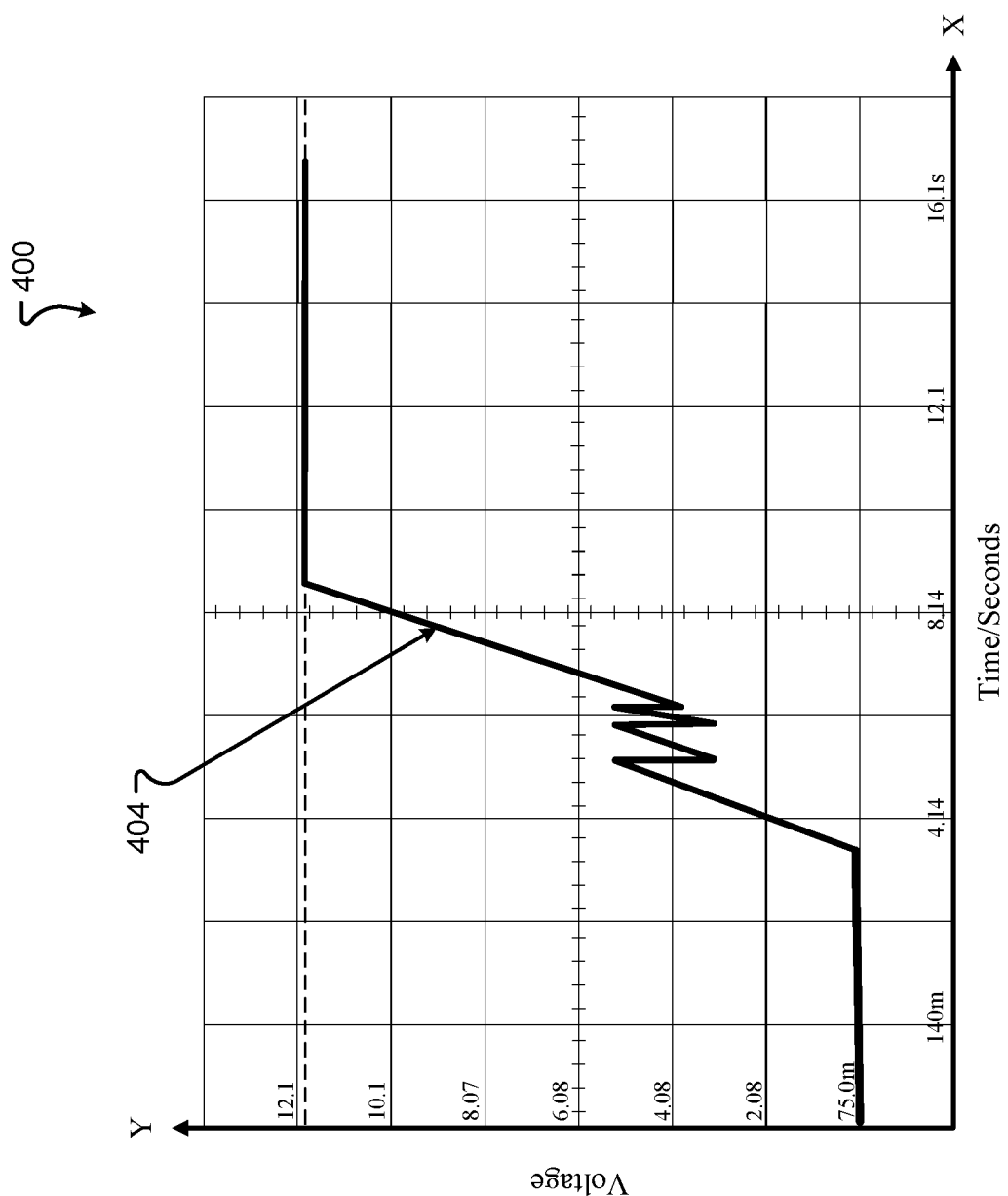
FIG. 4 is a graph showing an example test waveform of a transient voltage suppression (TVS) diode in a vibrational energy harvesting system in accordance with embodiments of the present disclosure.

FIG. 4 is a graph showing an example test waveform of a TVS diode incorporated in a vibrational energy harvesting system in accordance with embodiments of the present disclosure. The X-axis represents time measured in seconds (2 seconds per grid) and the Y-axis represents the harvesting voltage or the DC voltage across the supercapacitor and the TVS diode measured in volts. The waveform 404 illustrates the DC voltage after rectification whereby the voltage rises as the piezoelectric transducer vibrates until it reaches the TVS diode protecting point and the voltage is clamped at 11.8V. The vibrational energy is bypassed by the TVS diode, so the DC voltage cannot go any higher. (To show an obvious test waveform, a low capacity MLCC is used instead of the super-cap for filter and energy storage in this experiment).

The test result proves the TVS diode can bypass the redundant energy to protect the super-capacitor and DC-DC converter. According to embodiments of the present disclosure, the TVS diode clamping voltage is a range. According to an alternative embodiment of the present disclosure, the energy harvesting system 200 as illustrated in FIG. 2 is used with a vibrational generation test system for a simulated experiment. The piezoelectric transducer 208 of the vibrational energy harvesting system 200 has a measured self-resonant vibration frequency of 22.5 Hz. The vibrational generation test system is coupled to the piezoelectric transducer 208 and simulates shocks and vibrations. The vibrational generation test system is set to 22.5 Hz/0.15 G (g-force) vibration frequency/accelerated speed to match the vibration frequency of the piezoelectric transducer 208 to obtain an improved harvesting energy. The measured harvesting power is approximately 350 to 600 micro-watts to store in the super capacitor.

According to another alternative embodiment of the present disclosure, the energy harvesting system 200 as illustrated in FIG. 2 is used in one experiment of a human walking (which generates a first vibration frequency) and used in another experiment on a vehicle in operation (which generates a second vibration frequency). According to the first experiment, the energy harvesting system 200 is provided in the shoe of the human between the foot of the human and the insole of the shoe. The human for example is a female with a weight of 55 kg, a height of 169 cm and walking with the first vibration frequency of 0.8 to 1 Hz. According to the second experiment, the energy harvesting system 200 is couple to a spring of the automobile's suspension system and has a vibration frequency of 1 to 3 Hz when the automobile is in operation. The energy harvested in the first experiment was 51 to 211 micro-watts and the energy harvested in the second experiment was 300 to 2300 micro-watts.

Figure 5:
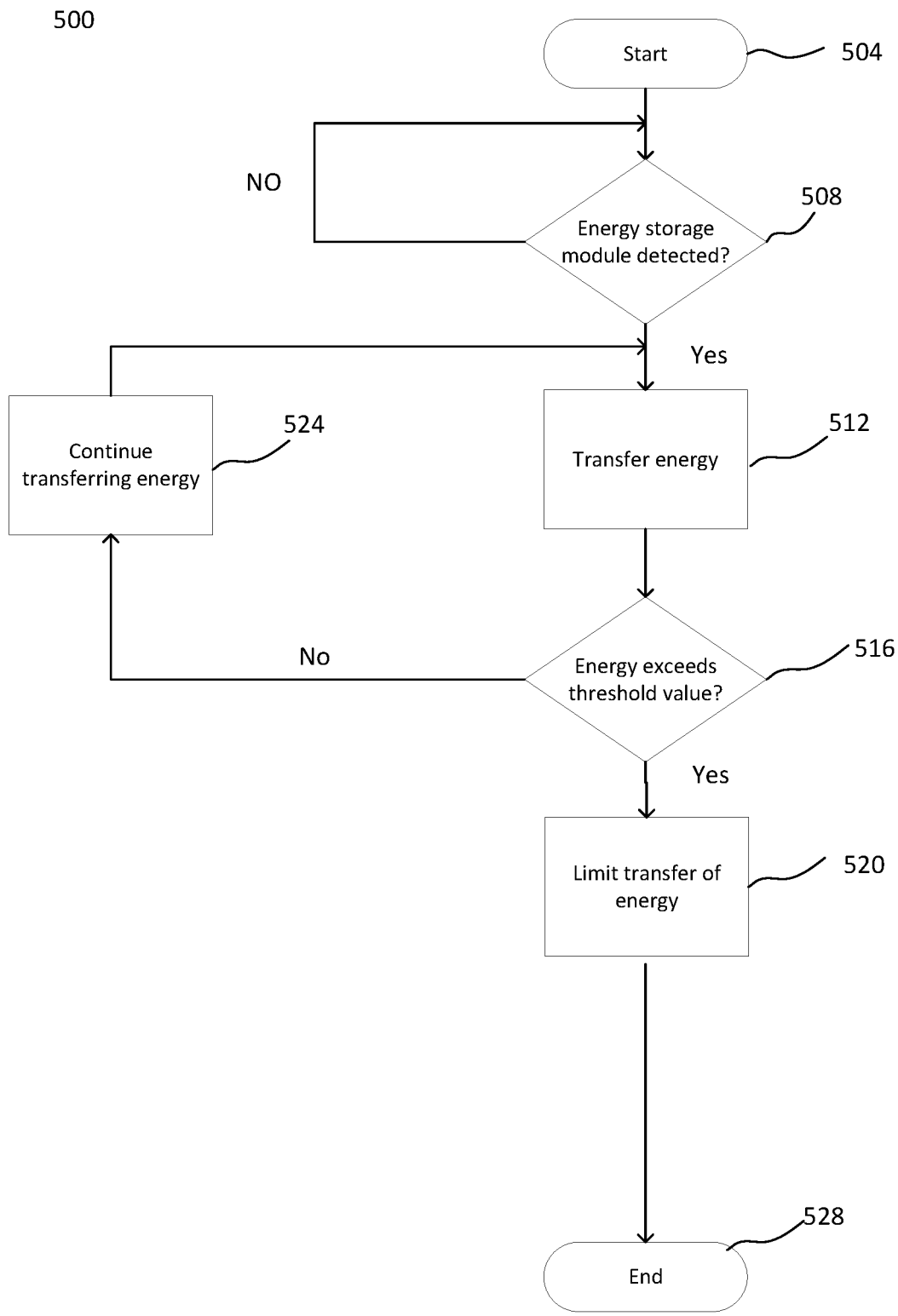
FIG. 5 is a flowchart illustrating an example process for vibrational energy harvesting in accordance with embodiments of the present disclosure.

FIG. 5 is a flowchart illustrating an example process 500 for vibrational energy harvesting in accordance with embodiments of the present disclosure. As illustrated in this example, process 500 begins at block 504. Process 500 may include a decision block 508 where the vibrational energy harvester detects if an energy storage module (e.g., a load, an electronic device, etc.) is coupled to vibrational energy harvester. If it the vibrational energy harvester detects an energy storage module coupled to vibrational energy harvester (Yes), process 500 continues to block 512 wherein energy is transferred to the energy storage module. Alternatively, if no energy storage module is detected, process 500 transitions back to block 508. Process 500 continues to decision block 516 wherein it is determined whether the energy transferred exceeds a predetermined threshold. If it is determined that the energy transferred exceeds the predetermined threshold (Yes) at block 516, process 500 continues to block 520 where the energy transferred to the energy storage module is limited by a passive device. Afterwards process 500 ends at block 524.

Conversely if it is determined that the energy transferred does not exceed the predetermined threshold (No) at block 516, the energy transferred to the energy storage module continues at block 526 and process 500 transitions back to block 512.

Figure 6:
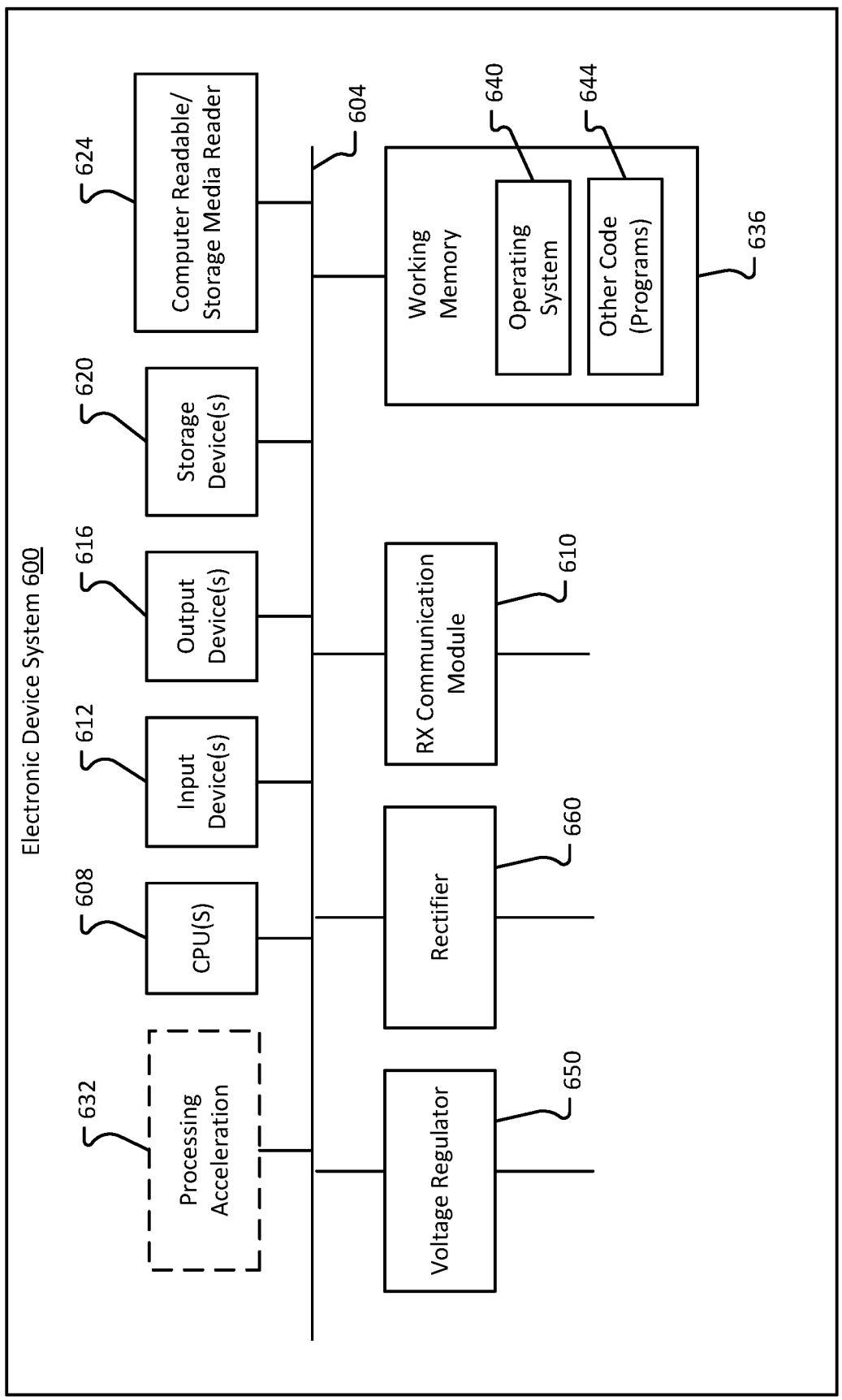
FIG. 6 is a block diagram of a load such as an electronic device system associated with one or more components described herein.

FIG. 6 is a block diagram of a load such as an electronic device system 600 associated with one or more components described herein. The electronic device system 600 is shown comprising hardware elements that may be electrically coupled via a bus 604. The hardware elements may include one or more central processing units (CPUs) 608; one or more input devices 612 (e.g., a mouse, a keyboard, etc.); and one or more output devices 616 (e.g., a display device, a printer, etc.). The electronic device system 600 may also include one or more storage devices 620. By way of example, the storage device(s) 620 may be disk drives, optical storage devices, solid-state storage devices such as a random access memory (RAM) and/or a read-only memory (ROM), which can be programmable, flash-updateable and/or the like. Examples of the processor 608 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The electronic device system 600 may additionally include a computer-readable storage media reader 624; an RX communication module 610 comprising a demodulate and modulator for frequency-shift keying (FSK) data to exchange data between the system and electronic device as well as other communication requirements, e.g., a modem, a network card (wireless or wired), an infra-red communication device, etc.); a rectifier 640, a voltage regulator 650, and working memory 636, which may include RAM and ROM devices as described above. The electronic device system 600 may also include a processing acceleration unit 632, which can include a DSP, a special-purpose processor, and/or the like.

The computer-readable storage media reader 624 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The RX communication module 610 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The electronic device system 600 may also comprise software elements, shown as being currently located within a working memory 636, including an operating system 640 and/or other code 644. Other code 644 that may be executed includes code implementing functionality required by the RX communication module 610, rectifier 660, and the voltage regulator 650. It should be appreciated that alternate embodiments of an electronic device system 600 may have numerous variations from that described above. For example, customized hardware might also be used and/or particular elements might be implemented in hardware, software (including portable software, such as applets), or both. Further, connection to other computing devices such as network input/output devices may be employed.

Any of the steps, functions, and operations discussed herein can be performed continuously and automatically.

The example systems and methods of this disclosure have been described in relation to a charging device, such as having a wireless charging device. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the embodiments illustrated herein show the various components in a single device, certain components can be in one or multiple devices. Thus, it should be appreciated, that the components can be combined into one or more devices.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A method of operating a vibrational energy harvesting system, comprising:
   providing an energy harvester and an energy storage module,
   wherein the energy storage module is coupled to the energy harvester to transfer energy to the energy storage module;
   determining whether the energy transferred exceeds a predetermined threshold; and
   limiting the energy transferred to the energy storage module by a transient voltage suppression (TVS) diode when the energy transferred exceeds the predetermined threshold; and
   providing the TVS diode in parallel with the energy storage module.

2. The method of claim 1, further comprising transferring energy to a load coupled to the energy storage module and the energy harvester.

3. The method of claim 1, wherein the TVS diode is able to limit the transfer of energy when the energy exceeds the predetermined threshold instantaneously.

4. The method of claim 1, further comprising coupling the load to the energy storage module and the energy harvester via a wired connection.

5. The method of claim 1, further comprising coupling the load to the energy storage module and the energy harvester via a wireless connection.

6. The method of claim 2, further comprising transferring energy to the load from the energy harvester when the energy harvester is in operation.

7. The method of claim 2, further comprising transferring energy to the load from the energy storage module when the energy harvester is not in operation.

8. The method according to claim 1, wherein the energy storage module includes at least one super capacitor.

9. A vibrational energy harvesting system, comprising:
   an energy harvester;
   an energy storage module arranged to receive transferred energy from the energy harvester; and
   a transient voltage suppression (TVS) diode configured to limit the energy transferred to the energy storage module when the energy transferred exceeds a predetermined threshold,
   wherein the TVS diode is provided in parallel with the energy storage module.

10. The vibrational energy harvesting system according to claim 9, further comprising a load coupled to the energy storage module and the energy harvester.

11. The vibrational energy harvesting system according to claim 9, wherein the TVS diode is able to limit the transfer of energy when the energy exceeds the predetermined threshold instantaneously.

12. The vibrational energy harvesting system according to claim 10, wherein the load is coupled to the energy storage module and the energy harvester via a wired connection.

13. The vibrational energy harvesting system according to claim 10, wherein the load is coupled to the energy storage module and the energy harvester via a wireless connection.

14. The vibrational energy harvesting system according to claim 10, wherein energy is transferred to the load from the energy harvester when the energy harvester is in operation.

15. The vibrational energy harvesting system according to claim 10, wherein energy is transferred to the load from the energy storage module when the energy harvester is not in operation.

16. The vibrational energy harvesting system according to claim 9, wherein the energy harvester is a piezoelectric transducer.

17. The vibrational energy harvesting system according to claim 9, wherein the energy storage module includes at least one super capacitor.

18. A circuit used in a vibrational energy harvesting system, comprising:
   an energy storage module arranged to receive transferred energy from an energy harvester; and
   a transient voltage suppression (TVS) diode configured to limit the energy transferred to the energy storage module when the energy transferred exceeds a predetermined threshold,
   wherein the TVS diode is provided in parallel with the energy storage module.

19. The circuit used in a vibrational energy harvesting system according to claim 18, wherein the energy storage module includes at least one super capacitor.

20. The circuit used in a vibrational energy harvesting system according to claim 18, wherein the TVS diode is able to limit the transfer of energy when the energy exceeds the predetermined threshold instantaneously.

* * * * *